(12) United States Patent  (10) Patent No.: US 12,285,871 B2
Yan et al.  (45) Date of Patent: Apr. 29, 2025

(54) ROBOT CONTROL METHOD, COMPUTER-READABLE STORAGE MEDIUM, AND ROBOT

(71) Applicant: UBTECH ROBOTICS CORP LTD, Shenzhen (CN)

(72) Inventors: Meng Yan, Shenzhen (CN); Chunyu Chen, Shenzhen (CN); Xuan Luo, Shenzhen (CN); Zhihao Zhang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 246 days.

(21) Appl. No.: 18/201,744

(22) Filed: May 24, 2023

(65) Prior Publication Data

US 2023/0381963 A1  Nov. 30, 2023

(30) Foreign Application Priority Data

May 30, 2022 (CN) .......................... 202210598024.6

(51) Int. Cl.
*B25J 9/16* (2006.01)
(52) U.S. Cl.
CPC ........... *B25J 9/1664* (2013.01); *B25J 9/1694* (2013.01)
(58) Field of Classification Search
CPC ...... B25J 9/1664; B25J 9/1694; B25J 9/1602; B25J 9/1607; B25J 9/1628; B25J 9/163; B25J 9/1656; B25J 9/1689; B25J 9/1671; B25J 9/1612; B25J 13/02; B25J 13/00; G05B 2219/36401; G05B 19/423; G05B 2219/39298; G05B 2219/39122; G05B 2219/36454; G05B 2219/39139; G05B 2219/39141; G05B 2219/40403; G05B 2219/35464
See application file for complete search history.

(56) References Cited

U.S. PATENT DOCUMENTS

| | | | |
|---|---|---|---|
| 2021/0078178 A1* | 3/2021 | Yamane | B25J 19/02 |
| 2021/0252699 A1* | 8/2021 | Ramani | B25J 9/1671 |
| 2022/0032461 A1* | 2/2022 | Gupta | B25J 9/1653 |
| 2024/0149458 A1* | 5/2024 | Watabe | B25J 9/1689 |

FOREIGN PATENT DOCUMENTS

| | | |
|---|---|---|
| CN | 110315570 A | 10/2019 |
| CN | 112540671 A | 3/2021 |

* cited by examiner

*Primary Examiner* — Abby Y Lin
*Assistant Examiner* — Esvinder Singh (57) ABSTRACT

A robot control method, a computer-readable storage medium, and a robot are provided. The method includes: obtaining first motion data, where the first motion data is human arm end motion data collected by a virtual reality device; obtaining second motion data by mapping the first motion data to a working space of an end of a robotic arm of the robot; obtaining a state of each joint of the robotic arm of the robot, and obtaining control data of the joint by performing a quadratic programming solving on the second motion data and the state of the joint; and controlling, by a motion controller of the robot, the robotic arm of the robot to move according to the obtained control data of each joint of the robot by transmitting the control data of the joint to the motion controller, so that the control method is relatively more natural, intuitive, and flexible.

15 Claims, 4 Drawing Sheets

ROBOT CONTROL METHOD, COMPUTER-READABLE STORAGE MEDIUM, AND ROBOT

CROSS REFERENCE TO RELATED APPLICATIONS

The present disclosure claims priority to Chinese Patent Application No. 202210598024.6, filed May 30, 2022, which is hereby incorporated by reference herein as if set forth in its entirety.

BACKGROUND

1. Technical Field

The present disclosure relates to robot technology, and particularly to a robot control method, a computer-readable storage medium, and a robot.

2. Description of Related Art

With the development of robot technology, people's requirements for robot technology are also constantly increasing. In order to make robots to substitute humans to do more tasks so as to release artificial labor, the robots need to perform various complex motions through robotic arms. In the existing methods, the robotic arm of a robot is generally controlled through complicated programming techniques, where the control method is not natural and intuitive enough, and has poor flexibility.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

In the embodiments of the present disclosure, a robot control method is provided, which may be applied to a humanoid robot including two robotic arms with seven degrees of freedom, where each robotic arm has joint(s), so as to control the robotic arm of the robot to perform anthropomorphic movements by following the movements of a human arm, thereby ensuring the real-time, reliability and accuracy of the movement of the robotic arm.

Figure 1:
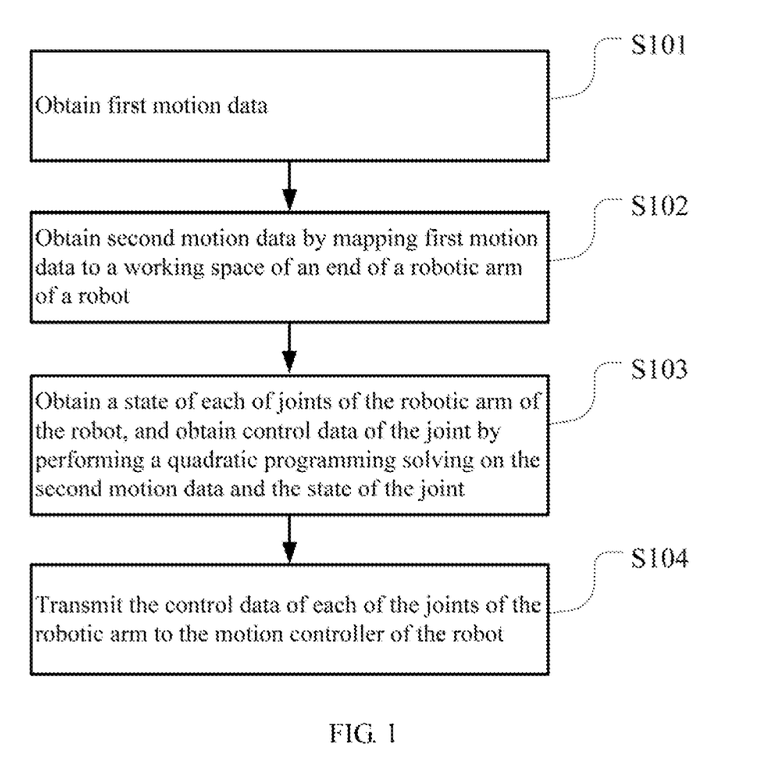
FIG. 1 is a flow chart of a robot control method according to an embodiment of the present disclosure.

FIG. 1 is a flow chart of a robot control method according to an embodiment of the present disclosure. In this embodiment, a control method for the above-mentioned robot is provided. As shown FIG. 1, the method may include the following steps.

S101: obtaining first motion data.

In which, the first motion data may be motion data of an end of a human arm (i.e., an arm of a human) that is collected by an electronic device such as a virtual reality (VR) device.

In this embodiment, the VR device may include components such as a laser locator and a control handle, and may include sensors such as a g-sensor, a gyroscope, a proximity sensor, and a gravity sensor. As an example, the control handle may be fixed at the end of the human arm so as to capture, through the laser locator, the motion data of the end of the human arm in real time. The motion data of the end of the arm may include three-dimensional position coordinates in a coordinate system of the VR device and posture data (i.e., a Euler angle).

In addition, the control handle may have button(s) for controlling the robot by, for example, switching control modes of the robot such as single-arm mode and double-arm mode, changing controlled states of the robot such as position, posture and pose, and controlling the start/stop of programs of the robot.

S102: obtaining second motion data by mapping the first motion data to a working space of an end of the robotic arm of the robot.

In this embodiment, during an initialization process, the position of the control handle in the coordinate system of the VR device may be obtained to set as an origin of an object coordinate system. During the subsequent movement of the human arm, the motion data of the end of the human arm in the object coordinate system, that is, the first motion data may be obtained to map, in proportion, to the working space of the end of the robotic arm of the robot so as to obtain the motion data, that is, the second motion data of the end of the robotic arm in a coordinate system of the robot.

S103: obtaining a state of each of the joints of the robotic arm of the robot, and obtaining control data of the joint by performing a quadratic programming solving on the second motion data and the state of the joint.

In which, the state of each of the joints of the robotic arm may be the real-time position and speed information of the joint of the robotic arm. Quadratic programming (QR) is mainly a process of selecting the optimal solution from multiple solutions while meeting the restriction conditions of equality and inequality, which is a nonlinear programming. In this embodiment, any existing quadratic programming solving method may be selected according to the actual needs. For example, an operator splitting quadratic program (OSQP) solver based on alternating direction method of multipliers (ADMM) may be used to calculate the control data of each of the joints of the robotic arm of the robot. The control data of each of the joints of the robotic arm may be expected position and speed information of the joint of the robotic arm.

S104: transmitting the control data of each of the joints of the robotic arm to a motion controller of the robot.

The motion controller may control the robotic arm of the robot to move according to the obtained control data of each of the joints of the robot. In this embodiment, the control cycle of the robot may be set in advance. In each control cycle, the control method of FIG. 1 can be executed once. The value of the control period may be set according to the hardware configuration of the robot and the complexity of the control method, for example, set to 5 milliseconds or other values, which is not limited herein.

In this embodiment, in order to ensure the smooth and safe operation of the robotic arm, as an example, the control data of each of the joints of the robotic arm that is obtained through step S103 may also be limited.

Figure 2:
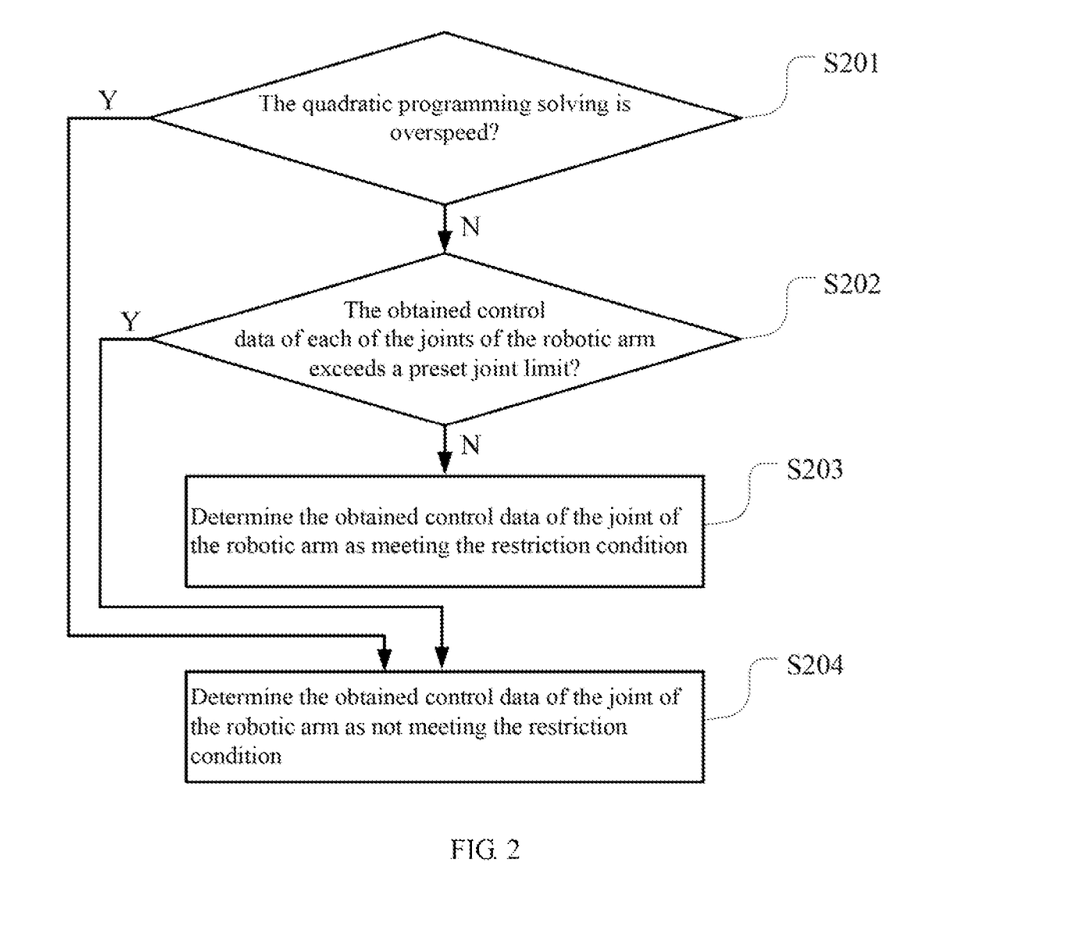
FIG. 2 is a flow chart of determining whether control data of each joint of the robotic arm meets a preset restriction condition in the robot control method of FIG. 1.

FIG. 2 is a flow chart of determining whether control data of each joint of the robotic arm meets a preset restriction condition in the robot control method of FIG. 1. As shown in FIG. 2, for example, after obtaining the control data of each of the joints through step S103, it may determine whether the control data of each of the joints of the robotic arm meets the preset restriction condition according to the steps shown in FIG. 2:

S201: determining whether the quadratic programming solving is overspeed based on the obtained control data of each of the joints of the robotic arm.

For example, a Jacobian matrix corresponding to the control data of each of the joints of the robotic arm may be calculated first, then a condition number may be calculated based on the Jacobian matrix, and then whether the condition number is larger than a preset condition number threshold may be determined. If the condition number is larger than the condition number threshold, it is determined that the quadratic programming solving is overspeed; otherwise, if the condition number is smaller than or equal to the condition number threshold, it is determined that the quadratic programming solving is not overspeed. In which, the value of the condition number threshold may be set according to actual needs, which is not limited herein.

If the quadratic programming solving is overspeed, step S204 will be executed; otherwise, step S202 will be executed.

S202: determining whether the obtained control data of the joint of the robotic arm exceeds a preset joint limit.

In this embodiment, a position range, that is, a joint limit corresponding to each of the joints of the robotic arm may be set in advance. As long as the control data of any joint exceeds its corresponding joint limit, it may be determined that the control data of the joint exceeds the joint limit.

If the control data of a joint of the robotic arm exceeds the joint limit, step S204 will be executed; otherwise, step S203 will be executed.

S203: determining the obtained control data of the joint of the robotic arm as meeting the restriction condition.

At this time, it will continue to execute step S104, that is, it will continue to transmit the control data of each of the joints to the motion controller of the robot in real-time, so that the motion controller of the robot controls the robotic arm of the robot to move according to the obtained control data of the joint of the robot.

S204: determining the obtained control data of the joint of the robotic arm as not meeting the restriction condition.

At this time, step S104 will not be executed anymore, that is, it will stop transmitting the control data of each of the joints of the robotic arm to the motion controller of the robot, and the motion controller will still control the robotic arm of the robot to move according to the last control data of each of the joints of the robotic arm that is received in the previous control cycle of the robot.

In the subsequent control cycles, it will continue to obtain the control data of each of the joints of the robotic arm of the robot through steps S101-S103, and determine whether the control data of each of the joints of the robotic arm meets the restriction condition. If yes, it continues to determine whether the control data of each of the joints of the robotic arm meets a preset transition ending condition.

For example, the data error between the control data of each of the joints of the robotic arm and the state of the joint may be calculated, and whether the data error is smaller than a preset error threshold may be determined. If yes, it may be determined that the control data of each of the joints of the robotic arm meets the transition ending condition; otherwise, it may be determined that the control data of each of the joints of the robotic arm does not meet the transition ending condition. In which, the value of the error threshold may be set according to the actual needs, which will not be limited herein.

If the transition ending condition is not met, the control data after smoothed of each of the joints of the robotic arm may be obtained by smoothing the control data of the joint. In this embodiment, any existing smoothing method may be selected according to actual needs, for example, it may smooth using a proportion differential (PD) controller. After obtaining the smoothed control data of each of the joints of the robot arm, the smoothed control data may be transmitted to the motion controller of the robot, so that the motion controller can control the robot arm to move according to the smoothed control data. In this manner, the data jittering that occurs due to the sudden recovery of the transmission of the real-time control data to the motion controller can be avoided. In which, the change process is transitioned by softening the change process through PD control strategy, so that the change of the control data is smoother.

If the transition ending condition is met, it continues to execute step S104, that is, it resumes to transmit the control data of each of the joints to the motion controller of the robot in real-time, so that the motion controller of the robot controls the robotic arm of the robot to move according to the obtained control data of the joint of the robot.

To sum up, in this embodiment, by obtaining first motion data, where the first motion data is human arm end motion data collected by a virtual reality device; obtaining second motion data by mapping the first motion data to a working space of an end of a robotic arm of the robot; obtaining a state of each joint of the robotic arm of the robot, and obtaining control data of the joint by performing a quadratic programming solving on the second motion data and the state of the joint; and controlling, by a motion controller of the robot, the robotic arm of the robot to move according to the obtained control data of each joint of the robot by transmitting the control data of the joint to the motion controller, the robotic arm of the robot can be controlled to move along with the human arm, so that the control method is relatively more natural, intuitive, and flexible.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 3:
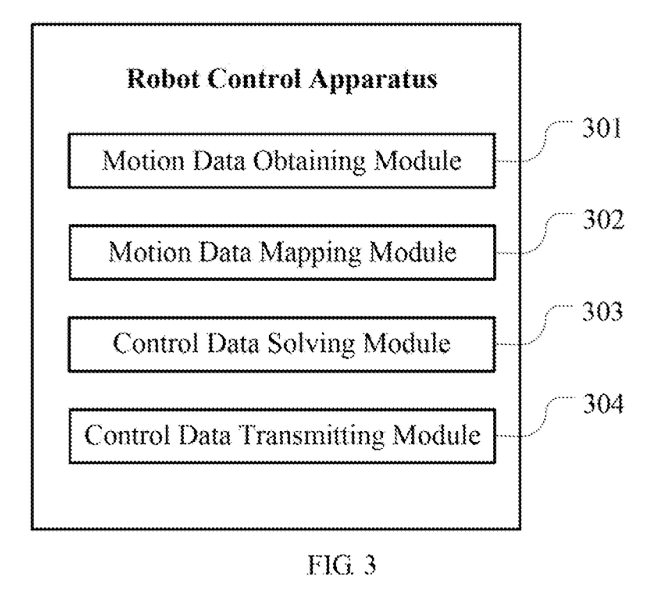
FIG. 3 is a schematic block diagram of a robot control apparatus according to an embodiment of the present disclosure.

FIG. 3 is a schematic block diagram of a robot control apparatus according to an embodiment of the present disclosure. As shown in FIG. 3, a control apparatus for the above-mentioned robot that corresponds to the robot control method described in the above-mentioned embodiment is provided.

In this embodiment, a robot control apparatus may include:
  a motion data obtaining module 301 configured to obtain first motion data, where the first motion data is human arm end motion data collected by a virtual reality device;
  a motion data mapping module 302 configured to obtain second motion data by mapping the first motion data to a working space of an end of the robotic arm of the robot;
  a control data solving module 303 configured to obtain a state of each of the joints of the robotic arm of the robot, and obtain control data of the joint by performing a quadratic programming solving on the second motion data and the state of the joint; and
  a control data transmitting module 304 configured to control, by a motion controller of the robot, the robotic arm of the robot to move according to the obtained control data of each of the joints of the robot by transmitting the control data of the joint to the motion controller.

In one embodiment, the robot control apparatus may further include:
  a restriction condition processing module configured to determine whether the control data of each of the joints of the robotic arm meets a preset restriction condition; stop transmitting the control data of each of the joints of the robotic arm to the motion controller of the robot, in response to not meeting the restriction condition; and continue transmitting the control data of each of the joints of the robotic arm to the motion controller of the robot, in response to meeting the restriction condition.

In one embodiment, the restriction condition processing module may include:
  a quadratic programming solving overspeed determining unit configured to determine whether the quadratic programming solving is overspeed based on the control data of each of the joints of the robotic arm;
  a first determination unit configured to determine the control data of the joint of the robotic arm as not meeting the restriction condition, in response to the quadratic programming solving being overspeed;
  a joint limit determining unit configured to determine whether the control data of the joint of the robotic arm exceeds a preset joint limit, in response to the quadratic programming solving being not overspeed;
  a second determination unit configured to determine the control data of the joint of the robotic arm as not meeting the restriction condition, in response to exceeding the joint limit; and
  a third determination unit configured to determine the control data of the joint of the robotic arm as meeting the restriction condition, in response to not exceeding the preset joint limit.

In one embodiment, the quadratic programming solving overspeed determining unit may be configured to calculate a Jacobian matrix corresponding to the control data of each of the joints of the robotic arm; calculate a condition number based on the Jacobian matrix; determine the quadratic programming solving as being overspeed, in response to the condition number being larger than a preset condition number threshold; and determine the quadratic programming solving as being not overspeed, in response to the condition number being smaller than or equal to the condition number threshold.

In one embodiment, the robot control apparatus may further include:
  a transition processing module configured to, in a subsequent control cycle of the robot, continue to obtain the control data of each of the joints of the robotic arm of the robot by performing the quadratic programming solving on the second motion data and the state of the joint; determine whether the control data of each of the joints of the robotic arm meets the restriction condition; determine whether the control data of each of the joints of the robotic arm meets a preset transition ending condition, in response to meeting the restriction condition; obtain smoothed control data of each of the joints of the robotic arm by smoothing the control data of the joint, in response to not meeting the transition ending condition; transmit the smoothed control data of each of the joints of the robotic arm to the motion controller of the robot; and continue to transmit the control data of each of the joints of the robotic arm to the motion controller of the robot, in response to meeting the transition ending condition.

In one embodiment, the restriction condition processing module may include:
  a transition ending condition determining unit configured to calculate a data error between the control data of each of the joints of the robotic arm and the state of the joint; determine whether the data error is smaller than a preset error threshold; determine the control data of each of the joints of the robotic arm as meeting the transition ending condition, in response to being smaller than the error threshold; and determine the control data of each of the joints of the robotic arm as not meeting the transition ending condition, in response to being larger than or equal to the error threshold.

In one embodiment, the restriction condition processing module may include:

a balance processing unit configured to obtain the smoothed control data of each of the joints of the robotic arm by smoothing the control data of the join using a proportional-derivative controller.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 4:
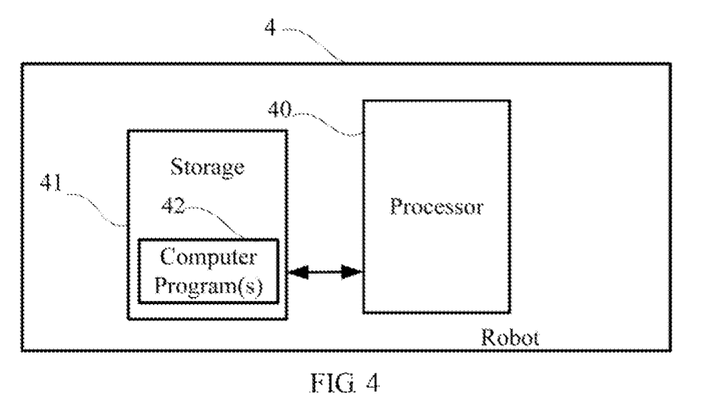
FIG. 4 is a schematic block diagram of a robot according to an embodiment of the present disclosure.

FIG. 4 is a schematic block diagram of a robot according to an embodiment of the present disclosure. For convenience of description, only parts related to this embodiment are shown.

As shown in FIG. 4, in this embodiment, the robot 4 includes a processor 40, a storage 41, and a computer program 42 stored in the storage 41 and executable on the processor 40. When executing (instructions in) the computer program 42, the processor 40 implements the steps in the above-mentioned embodiments of the robot control method, for example, steps S101-S104 shown in FIG. 1. Alternatively, when the processor 40 executes the (instructions in) computer program 42, the functions of each module/unit in the above-mentioned device embodiments, for example, the functions of the modules 301-304 shown in FIG. 3 are implemented.

Exemplarily, the computer program 42 may be divided into one or more modules/units, and the one or more modules/units are stored in the storage 41 and executed by the processor 40 to realize the present disclosure. The one or more modules/units may be a series of computer program instruction sections capable of performing a specific function, and the instruction sections are for describing the execution process of the computer program 42 in the robot 4.

The robot 4 may include, but is not limited to, the processor 40 and the storage 41. It can be understood by those skilled in the art that FIG. 4 is merely an example of the robot 4 and does not constitute a limitation on the robot 4, and may include more or fewer components than those shown in the figure, or a combination of some components or different components. For example, the robot 4 may further include an input/output device, a network access device, a bus, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store the computer program 42 and other programs and data required by the robot 4. The storage 41 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the an that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a robot with a robotic arm having one or more joints, comprising:
   obtaining first motion data, wherein the first motion data is human arm end motion data collected by a virtual reality device;
   obtaining second motion data by mapping the first motion data to a working space of an end of the robotic arm of the robot;
   obtaining a state of each of the joints of the robotic arm of the robot, and obtaining control data of the joint by performing a quadratic programming solving on the second motion data and the state of the joint;
   determining whether the quadratic programming solving is overspeed based on the obtained control data of each of the joints of the robotic arm;
   determining the obtained control data of the joint of the robotic arm as not meeting the restriction condition, in response to the quadratic programming solving being overspeed;
   determining whether the obtained control data of the joint of the robotic arm exceeds a preset joint limit, in response to the quadratic programming solving being not overspeed;
   determining the obtained control data of the joint of the robotic arm as not meeting the restriction condition, in response to exceeding the joint limit;
   determining the obtained control data of the joint of the robotic arm as meeting the restriction condition, in response to not exceeding the preset joint limit;
   stopping transmitting the obtained control data of the joint of the robotic arm to the motion controller of the robot, in response to not meeting the restriction condition;
   continuing transmitting the obtained control data of the joint of the robotic arm to the motion controller of the robot, in response to meeting the restriction condition; and
   controlling, by a motion controller of the robot, the robotic arm of the robot to move according to the obtained control data of each of the joints of the robot by transmitting the obtained control data of the joint to the motion controller.

2. The method of claim 1, determining whether the quadratic programming solving is overspeed based on the control data of each of the joints of the robotic arm comprises:
   calculating a Jacobian matrix corresponding to the control data of each of the joints of the robotic arm;
   calculating a condition number based on the Jacobian matrix;
   determining the quadratic programming solving as being overspeed, in response to the condition number being larger than a preset condition number threshold; and
   determining the quadratic programming solving as being not overspeed, in response to the condition number being smaller than or equal to the condition number threshold.

3. The method of claim 1, wherein after stopping transmitting the control data of each of the joints of the robotic arm to the motion controller of the robot, the method further comprises:
   in a subsequent control cycle of the robot, continuing to obtain the control data of each of the joints of the robotic arm of the robot by performing the quadratic programming solving on the second motion data and the state of the joint;
   determining whether the control data of each of the joints of the robotic arm meets the restriction condition;
   determining whether the control data of each of the joints of the robotic arm meets a preset transition ending condition, in response to meeting the restriction condition;
   obtaining smoothed control data of each of the joints of the robotic arm by smoothing the control data of the joint to transmit to the motion controller of the robot, in response to not meeting the transition ending condition; and
   continuing to transmit the control data of each of the joints of the robotic arm to the motion controller of the robot, in response to meeting the transition ending condition.

4. The method of claim 3, wherein determining whether the control data of each of the joints of the robotic arm meets the preset transition ending condition comprises:
   calculating a data error between the control data of each of the joints of the robotic arm and the state of the joint;
   determining whether the data error is smaller than a preset error threshold;
   determining the control data of each of the joints of the robotic arm as meeting the transition ending condition, in response to being smaller than the error threshold; and determining the control data of each of the joints of the robotic arm as not meeting the transition ending condition, in response to being larger than or equal to the error threshold.

5. The method of claim 3, wherein obtaining the smoothed control data of each of the joints of the robotic arm by smoothing the control data of the joint comprises:
obtaining the smoothed control data of each of the joints of the robotic arm by smoothing the control data of the joint using a proportional-derivative controller.

6. A non-transitory computer-readable storage medium for storing one or more computer programs, wherein the one or more computer programs comprise:
instructions for obtaining first motion data, wherein the first motion data is human arm end motion data collected by a virtual reality device;
instructions for obtaining second motion data by mapping the first motion data to a working space of an end of a robotic arm of a robot;
instructions for obtaining a state of each of one or more joints of the robotic arm of the robot, and obtaining control data of the joint by performing a quadratic programming solving on the second motion data and the state of the joint;
instructions for determining whether the quadratic programming solving is overspeed based on the obtained control data of each of the joints of the robotic arm;
instructions for determining the obtained control data of the joint of the robotic arm as not meeting the restriction condition, in response to the quadratic programming solving being overspeed;
instructions for determining whether the obtained control data of the joint of the robotic arm exceeds a preset joint limit, in response to the quadratic programming solving being not overspeed;
instructions for determining the obtained control data of the joint of the robotic arm as not meeting the restriction condition, in response to exceeding the joint limit;
instructions for determining the obtained control data of the joint of the robotic arm as meeting the restriction condition, in response to not exceeding the preset joint limit;
instructions for stopping transmitting the obtained control data of the joint of the robotic arm to the motion controller of the robot, in response to not meeting the restriction condition;
instructions for continuing transmitting the obtained control data of the joint of the robotic arm to the motion controller of the robot, in response to meeting the restriction condition; and
instructions for controlling, by a motion controller of the robot, the robotic arm of the robot to move according to the obtained control data of each of the joints of the robot by transmitting the obtained control data of the joint to the motion controller.

7. The storage medium of claim 6, determining whether the quadratic programming solving is overspeed based on the control data of each of the joints of the robotic arm comprises:
calculating a Jacobian matrix corresponding to the control data of each of the joints of the robotic arm;
calculating a condition number based on the Jacobian matrix;
determining the quadratic programming solving as being overspeed, in response to the condition number being larger than a preset condition number threshold; and
determining the quadratic programming solving as being not overspeed, in response to the condition number being smaller than or equal to the condition number threshold.

8. The storage medium of claim 6, wherein after stopping transmitting the control data of each of the joints of the robotic arm to the motion controller of the robot, the method further comprises:
in a subsequent control cycle of the robot, continuing to obtain the control data of each of the joints of the robotic arm of the robot by performing the quadratic programming solving on the second motion data and the state of the joint;
determining whether the control data of each of the joints of the robotic arm meets the restriction condition;
determining whether the control data of each of the joints of the robotic arm meets a preset transition ending condition, in response to meeting the restriction condition;
obtaining smoothed control data of each of the joints of the robotic arm by smoothing the control data of the joint to transmit to the motion controller of the robot, in response to not meeting the transition ending condition; and
continuing to transmit the control data of each of the joints of the robotic arm to the motion controller of the robot, in response to meeting the transition ending condition.

9. The storage medium of claim 8, wherein determining whether the control data of each of the joints of the robotic arm meets the preset transition ending condition comprises:
calculating a data error between the control data of each of the joints of the robotic arm and the state of the joint;
determining whether the data error is smaller than a preset error threshold;
determining the control data of each of the joints of the robotic arm as meeting the transition ending condition, in response to being smaller than the error threshold; and
determining the control data of each of the joints of the robotic arm as not meeting the transition ending condition, in response to being larger than or equal to the error threshold.

10. The storage medium of claim 8, wherein obtaining the smoothed control data of each of the joints of the robotic arm by smoothing the control data of the joint comprises:
obtaining the smoothed control data of each of the joints of the robotic arm by smoothing the control data of the joint using a proportional-derivative controller.

11. A robot, comprising:
a robotic arm having one or more joints;
a processor;
a memory coupled to the processor; and
one or more computer programs stored in the memory and executable on the processor;
wherein, the one or more computer programs comprise:
instructions for obtaining first motion data, wherein the first motion data is human arm end motion data collected by a virtual reality device;
instructions for obtaining second motion data by mapping the first motion data to a working space of an end of the robotic arm of the robot;
instructions for obtaining a state of each of the joints of the robotic arm of the robot, and obtaining control data of the joint by performing a quadratic programming solving on the second motion data and the state of the joint;

instructions for determining whether the quadratic programming solving is overspeed based on the obtained control data of each of the joints of the robotic arm;

instructions for determining the obtained control data of the joint of the robotic arm as not meeting the restriction condition, in response to the quadratic programming solving being overspeed;

instructions for determining whether the obtained control data of the joint of the robotic arm exceeds a preset joint limit, in response to the quadratic programming solving being not overspeed;

instructions for determining the obtained control data of the joint of the robotic arm as not meeting the restriction condition, in response to exceeding the joint limit;

instructions for determining the obtained control data of the joint of the robotic arm as meeting the restriction condition, in response to not exceeding the preset joint limit;

instructions for stopping transmitting the obtained control data of the joint of the robotic arm to the motion controller of the robot, in response to not meeting the restriction condition;

instructions for continuing transmitting the obtained control data of the joint of the robotic arm to the motion controller of the robot, in response to meeting the restriction condition; and instructions for controlling, by a motion controller of the robot, the robotic arm of the robot to move according to the obtained control data of each of the joints of the robot by transmitting the obtained control data of the joint to the motion controller.

12. The robot of claim 11, determining whether the quadratic programming solving is overspeed based on the control data of each of the joints of the robotic arm comprises:

calculating a Jacobian matrix corresponding to the control data of each of the joints of the robotic arm;

calculating a condition number based on the Jacobian matrix;

determining the quadratic programming solving as being overspeed, in response to the condition number being larger than a preset condition number threshold; and determining the quadratic programming solving as being not overspeed, in response to the condition number being smaller than or equal to the condition number threshold.

13. The robot of claim 11, wherein after stopping transmitting the control data of each of the joints of the robotic arm to the motion controller of the robot, the method further comprises:

in a subsequent control cycle of the robot, continuing to obtain the control data of each of the joints of the robotic arm of the robot by performing the quadratic programming solving on the second motion data and the state of the joint;

determining whether the control data of each of the joints of the robotic arm meets the restriction condition;

determining whether the control data of each of the joints of the robotic arm meets a preset transition ending condition, in response to meeting the restriction condition;

obtaining smoothed control data of each of the joints of the robotic arm by smoothing the control data of the joint to transmit to the motion controller of the robot, in response to not meeting the transition ending condition; and continuing to transmit the control data of each of the joints of the robotic arm to the motion controller of the robot, in response to meeting the transition ending condition.

14. The robot of claim 13, wherein determining whether the control data of each of the joints of the robotic arm meets the preset transition ending condition comprises:

calculating a data error between the control data of each of the joints of the robotic arm and the state of the joint;

determining whether the data error is smaller than a preset error threshold;

determining the control data of each of the joints of the robotic arm as meeting the transition ending condition, in response to being smaller than the error threshold; and determining the control data of each of the joints of the robotic arm as not meeting the transition ending condition, in response to being larger than or equal to the error threshold.

15. The robot of claim 13, wherein obtaining the smoothed control data of each of the joints of the robotic arm by smoothing the control data of the joint comprises:

obtaining the smoothed control data of each of the joints of the robotic arm by smoothing the control data of the joint using a proportional-derivative controller.

* * * * *